United States Patent
McGlaughlin et al.

(10) Patent No.: US 7,103,504 B1
(45) Date of Patent: Sep. 5, 2006

(54) METHOD AND SYSTEM FOR MONITORING EVENTS IN STORAGE AREA NETWORKS

(75) Inventors: Edward C McGlaughlin, Minneapolis, MN (US); John P Wagner, Minnetonka, MN (US); William C Backstrom, Eden Prairie, MN (US)

(73) Assignee: Qlogic Corporation, Aliso Viejo, CA (US)

( * ) Notice: Subject to any disclaimer, the term of this patent is extended or adjusted under 35 U.S.C. 154(b) by 0 days.

(21) Appl. No.: 10/719,077

(22) Filed: Nov. 21, 2003

(51) Int. Cl.
*G06F 11/30* (2006.01)
(52) U.S. Cl. .................................... 702/182
(58) Field of Classification Search ............... 702/182, 702/181; 370/228, 386; 379/133; 719/718; 717/172; 709/203, 201, 225; 714/708; 455/436; 307/42
See application file for complete search history.

(56) References Cited

U.S. PATENT DOCUMENTS

| | | | |
|---|---|---|---|
| 4,162,375 A | 7/1979 | Schlichte | 179/15 |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,725,835 A | 2/1988 | Schreiner et al. | 340/825.83 |
| 4,821,034 A | 4/1989 | Anderson et al. | 340/825 |
| 5,144,622 A | 9/1992 | Takiyasu et al. | 370/85.13 |
| 5,367,520 A | 11/1994 | Cordell | 370/60 |
| 5,598,541 A | 1/1997 | Malladi | 395/286 |
| 5,610,745 A | 3/1997 | Bennett | 359/139 |
| 5,687,172 A | 11/1997 | Cloonan et al. | 370/395 |
| 5,748,612 A | 5/1998 | Stoevhase et al. | 370/230 |
| 5,818,842 A | 10/1998 | Burwell et al. | 370/397 |
| 5,894,560 A | 4/1999 | Carmichael et al. | |
| 5,987,028 A | 11/1999 | Yang et al. | 370/380 |
| 5,999,528 A | 12/1999 | Chow et al. | 370/365 |
| 6,014,383 A | 1/2000 | McCarty | 370/453 |
| 6,021,128 A | 2/2000 | Hosoya et al. | 370/380 |
| 6,047,323 A | 4/2000 | Krause | 709/227 |
| 6,081,512 A | 6/2000 | Muller et al. | 370/256 |
| 6,118,776 A | 9/2000 | Berman | |

(Continued)

FOREIGN PATENT DOCUMENTS

EP 0649098 9/1994

(Continued)

OTHER PUBLICATIONS

Clark, Tom, "Zoning for Fibre Channel Fabrics", Vixel Corporation Paper—XP002185194., (Aug. 1999), pp. 1-6.

(Continued)

*Primary Examiner*—Bryan Bui
*Assistant Examiner*—Tung S. Lau
(74) *Attorney, Agent, or Firm*—Tejinder Singh; Klein, O'Neill & Singh, LLP (57) ABSTRACT

A method and system for monitoring events in a storage area network is provided. The system includes a threshold monitoring module that receives a message from plural monitoring agents indicating if a parameter varies from a threshold value, and in response to the message, the threshold monitoring module coordinates an event. The threshold values are stored and updated in a threshold table. The monitoring agents include a Chassis monitoring module, a fabric monitoring module, a port monitoring module, and/or an Nx_port event monitoring module. An event response module is notified of the variation and an event is generated in response to the notification based on an event table. The method includes, monitoring plural events by using plural monitoring agents in a fabric switch; comparing a parameter value to a threshold value for the parameter; and notifying a threshold monitoring module if the parameter value varies from the threshold value.

32 Claims, 5 Drawing Sheets

U.S. PATENT DOCUMENTS

| | | | |
|---|---|---|---|
| 6,128,292 A | 10/2000 | Kim et al. | 370/356 |
| 6,144,668 A | 11/2000 | Bass et al. | |
| 6,160,813 A | 12/2000 | Banks et al. | 370/422 |
| 6,292,483 B1* | 9/2001 | Kerstein | 370/389 |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,353,612 B1 | 3/2002 | Zhu et al. | |
| 6,411,599 B1 | 6/2002 | Blanc et al. | 370/219 |
| 6,424,658 B1 | 7/2002 | Mathur | 370/429 |
| 6,449,274 B1 | 9/2002 | Holden et al. | 370/392 |
| 6,597,691 B1 | 7/2003 | Anderson et al. | 370/360 |
| 6,597,777 B1* | 7/2003 | Ho | 379/133 |
| 6,697,359 B1 | 2/2004 | George | 370/357 |
| 6,760,302 B1* | 7/2004 | Ellinas et al. | 370/228 |
| 2001/0038628 A1 | 11/2001 | Ofek, et al. | 370/392 |
| 2003/0016683 A1 | 1/2003 | George et al. | |
| 2003/0091062 A1 | 5/2003 | Lay et al. | |
| 2003/0120983 A1* | 6/2003 | Vieregge et al. | 714/708 |
| 2003/0179748 A1 | 9/2003 | George et al. | 370/389 |
| 2003/0189935 A1 | 10/2003 | Warden et al. | |
| 2004/0013092 A1 | 1/2004 | Betker et al. | |
| 2004/0013125 A1 | 1/2004 | Betker et al. | |
| 2004/0028038 A1 | 2/2004 | Anderson et al. | |
| 2004/0141521 A1 | 7/2004 | George | 370/463 |

FOREIGN PATENT DOCUMENTS

| | | |
|---|---|---|
| EP | 0856969 | 1/1998 |
| WO | WO-98/36537 | 8/1998 |

OTHER PUBLICATIONS

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Consideration for Storage Area Networks", Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

Curtis, A. R., "Design Considerations for 10-Gbit Fibre Channel", *Curtis A. Ridgeway, Distinguished I/O Architect, Stoarge and Computing ASIC's Division, LSI Logic Corp.*

Malavalli, Kumar, "High Speed Fibre Channel Switching Fabric Devices", *Proceedings of the SPIE, SPIE, Bellingham, VA, USA vol. 1577*, XP000562869, ISSN: 0277-786X,(Sep. 4, 1991),216-226.

Melhem, et al., "Minimizing Wavelength Conversions in WDM Path Establishment", *Computer Science Department, University of Pittsburgh, Pittsburgh, PA 15260*, (2001), 197-211.

Ridgeway, Curt, "0GFC-40GFC using 4-lane XAUI's", *LSI Logic Presentation—T11/03-069v0.*

* cited by examiner

METHOD AND SYSTEM FOR MONITORING EVENTS IN STORAGE AREA NETWORKS

BACKGROUND

1. Field of the Invention

The present invention relates to storage area networks, and more particularly, to monitoring events in storage area networks.

2. Background of the Invention

Storage Area Networks ("SANs") provide multiple paths to host computing systems to access memory devices (or storage devices). The multiple paths allow host systems to access data in the event of a failure.

Various standards are used for operating SANs. One such standard is Fibre Channel. Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames a Fibre Channel port can transmit without overflowing the receive buffers at the other end of the link. Receiving an R_RDY primitive signal increases the credit, and sending a frame decreases the credit.

In conventional SAN systems, if an input/output operation is "timed out", (i.e. it takes longer than say a threshold value) it results in an application time-out. This results in a prolonged recovery operation and reduces the overall availability of data to a user using a host computing system. Hence, in conventional systems, recovery occurs after a failure has already occurred.

As SANs become more complex with higher bandwidth requirements there is a need for detecting failure and re-routing data requests before the actual failure occurs and disrupts information flow within the SAN.

SUMMARY OF THE INVENTION

In one embodiment of the present invention, a system for monitoring at least one event and detecting at least one indicator that precedes a failure in a storage area network is provided. The system includes, a switch element having a port-monitoring module that detects when a fibre channel port link indicator varies from a threshold value for the fibre channel port link parameter.

The port-monitoring module sends a message to a performance-monitoring module to process an event when the fibre channel port link indicator varies from the threshold value. The performance-monitoring module may notify a host computer when the fibre channel port link indicator varies from the threshold value, and the fibre channel port whose port link parameter varies from the threshold value may be taken off-line.

In yet another embodiment of the present invention, the system includes a fabric monitoring module that detects when a remote fabric switch and a local fabric switch cannot exchange information and then sends a message to a threshold monitoring module.

The host system is notified that the remote and the local fabric switch cannot exchange information.

In yet another embodiment of the present invention, the system includes a chassis monitoring module that detects when an indicator varies from a threshold value and notifies the threshold monitoring module of the variation.

In yet another embodiment of the present invention, the threshold-monitoring module receives a message from at least one monitoring agent indicating if an indicator varies from a threshold value, and in response to the message, the threshold monitoring module coordinates an event. The threshold values are stored and updated in a threshold table. The monitoring agent includes the Chassis monitoring module, the fabric monitoring module, the port monitoring module, and/or an Nx_port event monitoring module.

The threshold-monitoring module notifies an event response module when an indicator value varies from a threshold value and an event is generated in response to the notification based on an event table.

In yet another embodiment of the present invention, a method for monitoring at least one event and detecting at least one indicator that precedes a failure in a storage area network is provided. The method includes, monitoring at least one event by using at least one monitoring agent in a fabric switch; comparing an indicator value to a threshold value for the indicator; and notifying a threshold-monitoring module if the parameter value varies from the threshold value.

In one aspect of the present invention, various events are monitored in real time, which can result in the failure of certain SAN components/services. This allows a system to be intelligent and preemptive, which avoids disruption of SANs.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"E-Port": A fabric expansion port that attaches to another Interconnect port to create an Inter-Switch Link.

"F-Port": A port to which non-loop N_Ports are attached to a fabric and does not include FL_Ports.

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": A system which interconnects various ports attached to it and is capable of routing fibre channel frames by using destination identifiers provided in FC-2 frame headers.

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.--Port or F.Sub.--Port.

"L_Port": A port that contains Arbitrated Loop functions associated with the Arbitrated Loop topology.

"N-Port": A direct fabric attached port.

"NL_Port": A L_Port that can perform the function of a N_Port.

"Switch": A fabric element conforming to the Fibre Channel Switch standards.

To facilitate an understanding of the preferred embodiment, the general architecture and operation of a fibre channel system will be described. The specific architecture and operation of the preferred embodiment will then be described with reference to the general architecture of the fibre channel system.

Figure 1A:
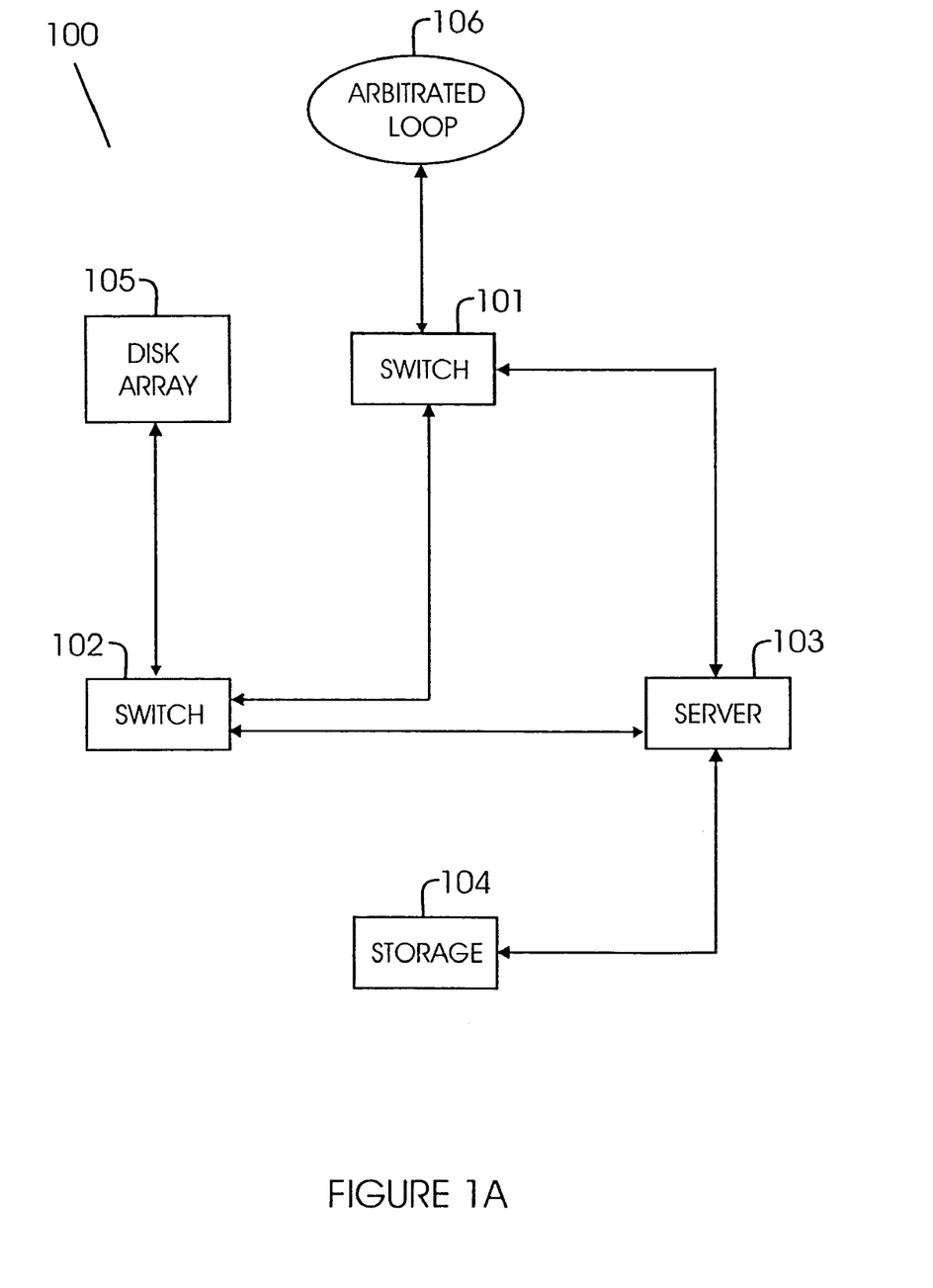
FIG. 1A is a block diagram of a fibre channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A frame-switched path may be established using multiple links, e.g. an N-Port in server 103 may establish a path with disk array 105 through switch 102.

Figure 1B:
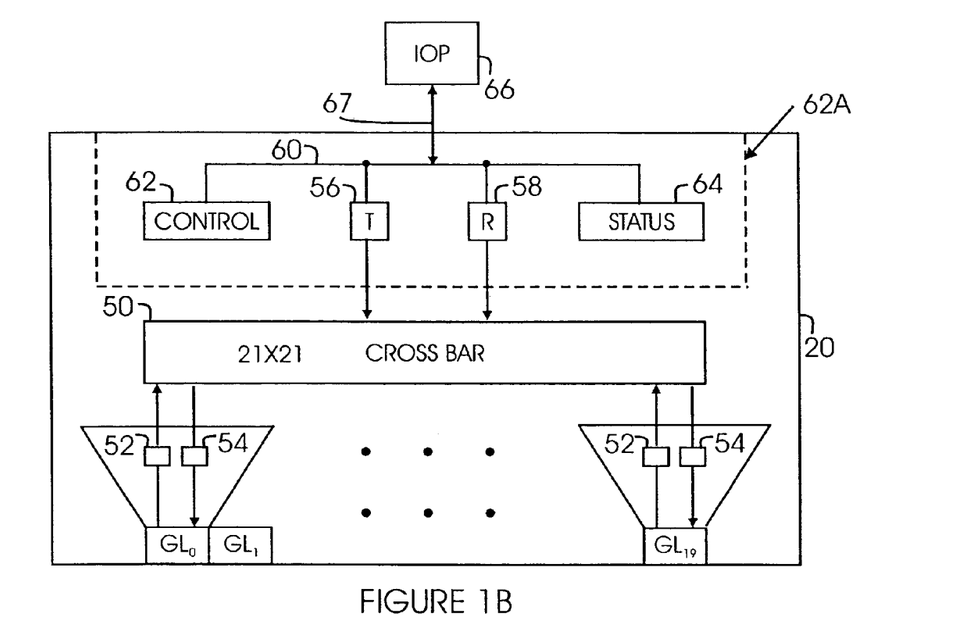
FIGS. 1B–1D show block diagrams of various switch element configurations used according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
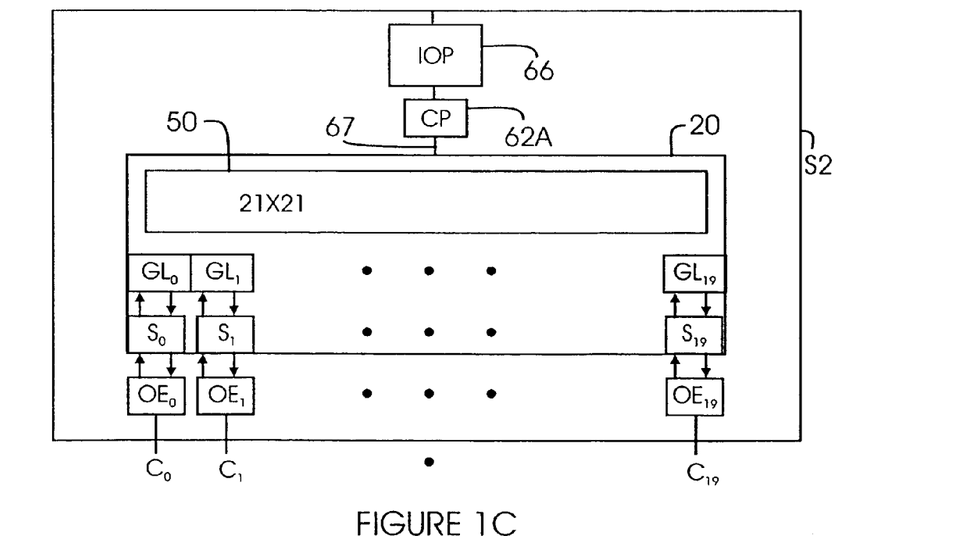

In the preferred embodiments of switch chasis described herein, the fabric controller is a firmware-programmed microprocessor, also referred to as the input/out processor "IOP"). IOP 66 is shown in FIG. 1C as a part of a switch chasis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring modules, as discussed below with respect to FIG. 2.

FIG. 1C shows a 20-channel switch chassis S2 using ASIC 20 and IOP 66. S2 will also include other elements, for example, a power supply (not shown). The 20 GL ports correspond to channel C0–C19. Each GL port has a serial/deserializer (SERDES) designated as S0–S19. Ideally, the SERDES functions are implemented on ASIC 20 for efficiency, but may alternatively be external to each GL port.

Each GL port has an optical-electric converter, designated as OE0–OE19 connected with its SERDES through serial lines, for providing fibre optic input/output connections, as is well known in the high performance switch design. The converters connect to switch channels C0–C19. It is noteworthy that the ports can connect through copper paths or other means instead of optical-electric converters.

Figure 1D:
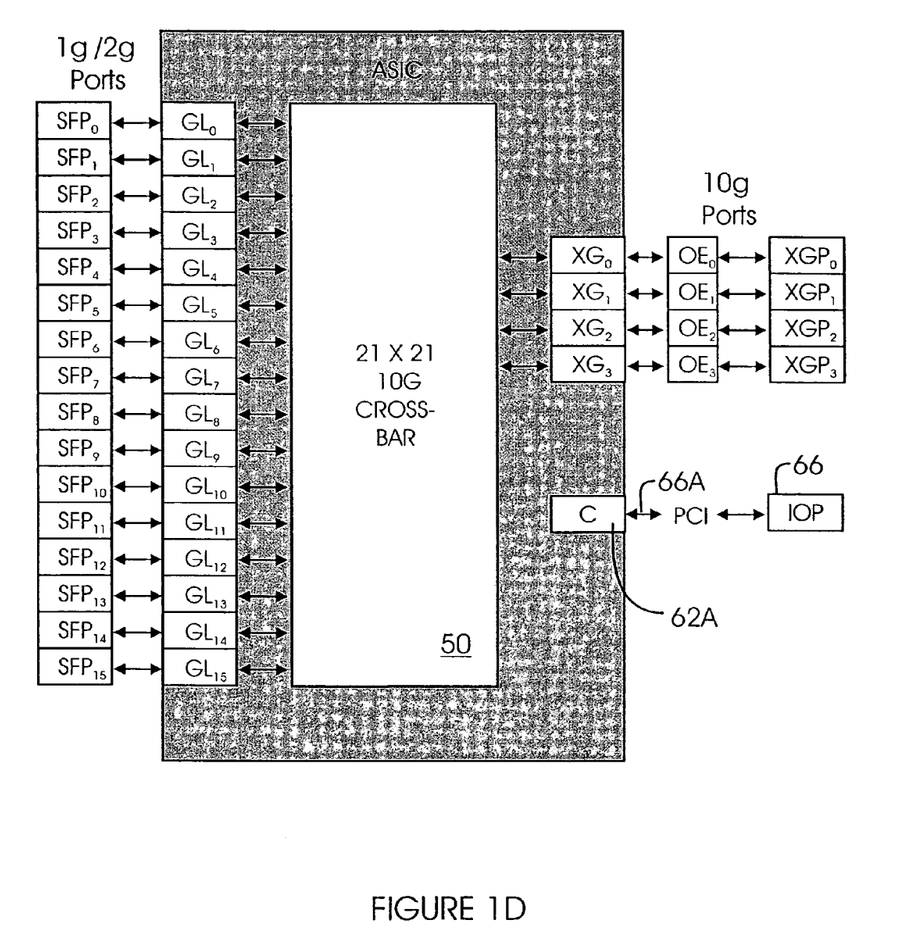

FIG. 1D shows a block diagram of ASIC 20 with sixteen GL ports and four 10G port control modules designated as XG0–XG3 for four 10G ports designated as XGP0–XGP3. ASIC 20 include a control port 62A that is coupled to IOP 66 through a PCI connection 66A.

Figure 2:
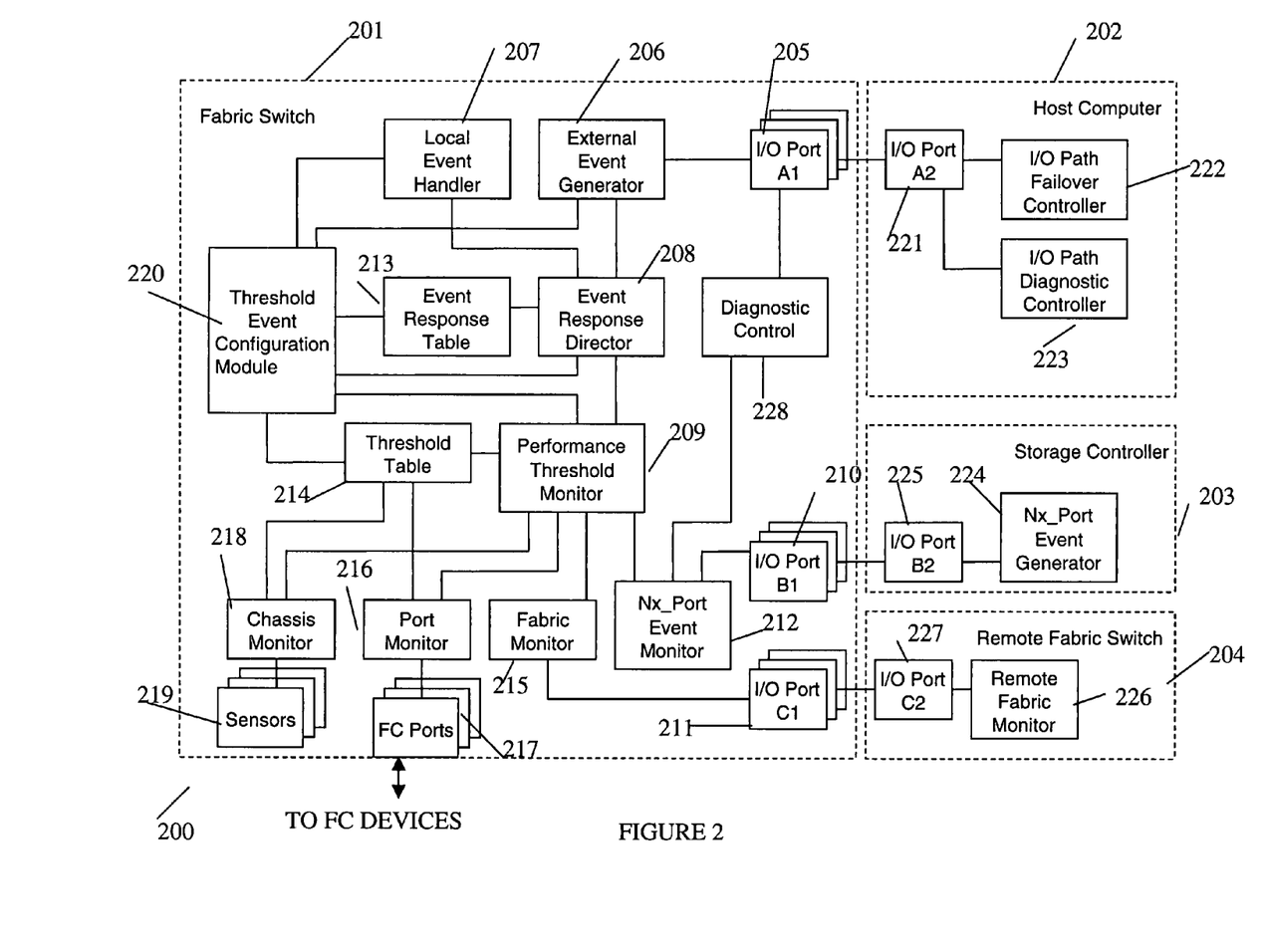
FIG. 2 shows a block diagram of a system for monitoring events and detecting failure, according to one aspect of the present invention.

FIG. 2 shows a block diagram of a system 200, according to one embodiment of the present invention that provides an I/O path guard mechanism that improves overall SAN system efficiency. System 200 includes a fabric switch 201, a host computer 202, a storage controller 203 and a remote fabric switch 204.

It is noteworthy that the present invention is not limited to any particular number of remote switches, host computers, fabric switches or number of ports. For example, although only one remote fabric switch 204 is shown to illustrate the adaptive aspects of the present invention, other remote switches can be used with system 200.

It is noteworthy that some of the components in modules 201–204 have not been shown, as they are well known in the art. For example, a host computer 202 includes a central processing unit, storage devices, random access memory, read-only memory, keyboard, video interfaces and other devices that have not been described.

Fabric switch 201 is of the type discussed above with respect to FIGS. 1B–1D. However, other configurations may be used with system 200. Fabric switch 201 has plural monitoring modules that monitor various indicators/parameters/events (may be referred to as an indicator, parameter or an event). Every indicator has a threshold and a variation from the threshold value can result in a failure. When the monitoring agent detects a variation, it notifies a performance threshold monitoring module, as described below, which processes the event depending upon the function of the indicator. A host computer may also be notified of a possible failure to take preemptive action.

Fabric switch 201 is coupled to a host computer 202. I/O Port 205 and 221 provide connectivity between host computer 202 and fabric switch 201. It is noteworthy that plural I/O ports 205 and 221 may be used to couple plural host computing systems.

Fabric Switch 201 is also coupled to storage controller 203 using ports 210 and 225. Once again, plural number of ports 210 and 225 may be used to couple fabric switch 201 to more than one storage controller 203. In one aspect of the present invention, storage controller 203 is a redundant array of independent disks ("RAID") controller and/or host bus adapter ("HBA").

RAID controllers control access to plural disks. An HBA is an I/O adapter that sits between a host computer's bus and the fibre channel loop and manages the transfer of information between the two channels. Both the RAID controller and HBAs have various components, for example, a processor, memory, and arbitration modules that allow them to operate with host computers, storage systems, and fabric switches. The present invention is not limited to any particular structure or type of storage controller 203.

Turning now in more detail to fabric switch 201, it includes a Performance Threshold Monitor module 209, which monitors the threshold status and events related to plural monitoring agents (discussed below) and compares the monitored status with threshold values maintained in Threshold Table 214. The monitoring agents include Chassis Monitor 218, Nx_Port Event Monitor 212, Port Monitor 216, and Fabric Monitor 215, which are described below.

Chassis Monitor 218 tracks the temperature of the switch chassis (not shown), the power supply status, and fan (not shown) speed using sensors 219. When a status value exceeds the threshold configured in Threshold Table 214, a control signal (this term as used in the specification includes commands and/or message packets) is sent from Chassis Monitor 218 to Performance Threshold Monitor 209 for further processing of the event.

Performance threshold monitor 209 may send a signal to host computer 202 and/or remote fabric switch 204 when an operational parameter varies from a threshold value in table 214. Host computer 202 may perform a shut down of fabric switch 201 upon such a signal and may select an alternative path for subsequent I/O transfers.

Nx_Port Event Monitor 212 receives events generated by SAN targets such as Storage Controller 203. These events include failed internal path notifications and other internal threshold errors. Nx_Port Event Monitor 212 supports a plurality of instances of I/O Port B1 modules 210 to monitor a plurality of Storage Controller 203 SAN targets.

When an event is received, Nx_Port Event Monitor 212 sends a control signal to Performance Threshold Monitor 209 for further processing of the event. Nx_Port Event Monitor 212 is also coupled to a diagnostic control module 228 that performs diagnostics based on certain events and threshold variations. The diagnostic information may be sent to host computer 202 via I/O port 205.

Storage controller 203 includes an event generator 224 that can issue events/message based on internal errors.

Port Monitor 216 tracks port statistics for all FC ports 217 on Fabric Switch 201. FC ports 217 are used to couple plural devices to switch 201. The statistics monitored including total words transmitted and received, CRC errors, link resets, invalid transmission words, loss of sync and excessive congestion and other link error conditions.

When a status value exceeds the threshold values configured/stored in Threshold Table 214, a control signal is sent from Port Monitor 216 to Performance Threshold Monitor 209 for further processing of the event. In one aspect of the present invention, a port is taken offline and/or a Performance Threshold Monitor 209 notifies host computer 202 of the threshold variation/violation.

Fabric Monitor 215 tracks the operation of Remote Fabric Switch 204 in a SAN. Fabric Monitor 215 issues keep-alive handshake messages through I/O Port C1 211 to other switches (for example, switch 204) in the SAN. Fabric Monitor 215 supports a plurality of instances of I/O Port C1 modules 211 to monitor a plurality of Remote Fabric Switch 204 in the SAN. The I/O Port C1 modules 211 may be based on Ethernet or Fibre Channel standards.

When messages/information cannot be exchanged with a given Remote Fabric Switch 204, Fabric Monitor 215 sends a control signal to Performance Threshold Monitor 209. Fabric Monitor 215 also receives Remote Fabric Switch events such as forced fail-over for I/O blade failure and for switches being taken offline for servicing. Fabric Monitor 215 issues control signals to Performance Threshold Monitor 209 for further processing of these events.

In one aspect of the present invention, when a remote fabric switch 204 does not respond, the E_Port connecting to the remote fabric switch 204 is taken off-line. An event command may also be sent to host 202. In case of a partial failure, host computer 202 may take over a portion of the remote switch data path.

Performance Threshold Monitor 209 consolidates the threshold events and control signals sent by the monitoring agents and if the thresholds defined in Threshold Table 214 have been exceeded, a control signal is sent to Event Response Director 208 for further processing.

Event Response Director 208 uses the control signals sent by Performance Threshold Monitor 209 to select an event (routing and handling) as defined in Event Response Table 213. Based on the selected event routing and handling definition, Event Response Director 208 sends control signals to Local Event Handler 207 and External Event Generator 206.

Local Event Handler 207 performs control actions on the local Fabric Switch 201. This includes operations such as taking an E_Port down and forcing new inter-switch routing as well as shutting down the switch in an over-temperature situation.

External Event Generator 206 prepares and sends I/O PathGuard RSCNs (Registered State Change Notice) to registered Host Computers (202) through the I/O Port A1 interface 205. External Event Generator 206 supports a plurality of instances of I/O Port A1 modules 205 to notify a plurality of Host Computers 202. Host Computer I/O Path Failover Controller 222 receives the I/O PathGuard RSCN and uses this event to trigger a path failover whereby SCSI traffic is redirected to be sent over an alternative path.

At the completion of the path failover processing, Host Computer I/O Path Failover Controller 202 sends a control signal back to the Fabric Switch via I/O Port A2 221. External Event Controller 206 forwards Host Computer 202 response to Event Response Director 208 to complete the event handling.

Threshold Event Configuration module 220 updates the Event Response Table 213 and the Threshold Table 214 based on user requests using host computer 202. Tables 213 and 214 can be updated based on history of certain failures and any other reliability data that may be useful to predict failures.

Host Computer 202 may initiate diagnostic action via I/O Path Diagnostic Controller 223 by sending a control signal to the Fabric Switch Diagnostic Control module (not shown). The Diagnostic Control may initiate loop back diagnostics and supports diagnostic probes to the attached devices.

Figure 3:
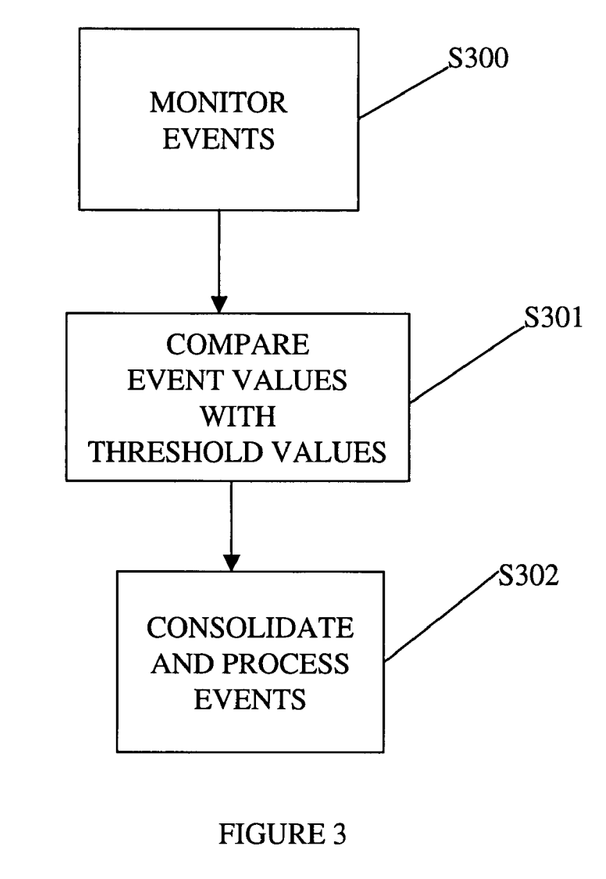
FIG. 3 shows a process flow diagram for monitoring events, according to one aspect of the present invention.

FIG. 3 shows a process flow diagram for monitoring events in a SAN and then responding to events to avoid disruption in the SAN operation.

Turning in detail to FIG. 3, in step S300, a fabric switch 201 monitors plural events occurring in connection with plural monitoring agents. For example, Chassis Monitor 218, as described above with respect to FIG. 2, tracks the temperature of the switch chassis (not shown), the power supply status, and fan (not shown) speed; Nx_Port Event Monitor 212 receives events generated by SAN targets such as Storage Controller 203; Port Monitor 216 tracks port statistics for all the FC ports 217 on Fabric Switch 201; and Fabric Monitor 215 tracks the operation of Remote Fabric Switch 204 in a SAN.

In step S301, the process compares an events status value with a threshold value for the event. For example, in the case of a Chassis Monitor 218, as described above with respect to FIG. 2, when a status value exceeds the threshold value configured in Threshold Table 214, a control signal (this term as used in the specification includes commands and/or message packets) is sent from Chassis Monitor 218 to Performance Threshold Monitor 209 for further processing of the event. Other agents perform the same.

In step S302, the process consolidates the various control signals from plural monitoring agents and then processes the events. Performance Threshold Monitor 209 processes the events, as described above.

In one aspect of the present invention, various events are monitored in real time, which can result in the failure of certain SAN components/services. This allows a system to be intelligent and retroactive, which avoids disruption of SANs.

Although the present invention has been described with reference to specific embodiments, these embodiments are illustrative only and not limiting. For example, the various modules shown in FIG. 2 may be consolidated as a single software and/or hardware function to perform the various operations that have been described above. Many other applications and embodiments of the present invention will be apparent in light of this disclosure and the following claims.

What is claimed is:

1. A system for monitoring events in a storage area network, comprising:

a fibre channel fabric switch element having a port monitoring agent that monitors at least a parameter value and detects when a parameter value varies from a threshold value stored in a threshold table for a parameter, wherein the port monitoring agent sends a message to a performance monitoring module that sends a message to an Event Response Director that selects an event in an Event Response Table and sends control signals to a Local Event Handler and an External Event Generator, and the Local Event Handler performs control actions on a local fabric switch and the External Event Generator sends input/output registered state change notices to host computing systems; and the Event Response Table and the threshold table is updated by a Threshold Event Configuration module based on historical data.

2. The system of claim 1, wherein the performance monitoring module notifies a host computer when the parameter value varies from the threshold value.

3. The system of claim 1, wherein a fibre channel port with a parameter value that varies from the threshold value is taken off-line.

4. A system for monitoring events in a storage area network, comprising:
a fabric monitoring module in a fibre channel fabric switch element, wherein the fabric monitoring module detects when a remote fabric switch and a local fabric switch cannot exchange information and then sends a message to a performance monitoring module that sends a message to an Event Response Director that selects an event in an Event Response Table and sends control signals to a Local Event Handler and an External Event Generator, and the Local Event Handler performs control actions on a local fabric switch and the External Event Generator sends input/output registered state change notices to host computing systems; and the Event Response Table and the threshold table are updated by a Threshold Event Configuration module based on historical data.

5. The system of claim 4, wherein a host system is notified by the performance monitoring module that the remote and the local fabric switch cannot exchange information.

6. A system for monitoring events in a storage area network, comprising:
a chassis monitoring module in a fibre channel fabric switch element THAT detects when an indicator value for a switch chassis of the fibre channel fabric switch element varies from a threshold value and notifies a performance monitoring module of the variation and the performance monitoring module sends a message to an Event Response Director that selects an event in an Event Response Table and sends control signals to a Local Event Handler and an External Event Generator; and the Local Event Handler performs control actions on a local fabric switch; and the External Event Generator sends input/output registered state change notices to host computing systems; and the Event Response Table and the threshold table is updated by a Threshold Event Configuration module based on historical data.

7. The system of claim 6, wherein a host computer is notified of the variation by the performance monitoring module.

8. The system of claim 6, wherein a remote fabric switch is notified of the variation by the performance monitoring module.

9. A system for monitoring events in a storage area network comprising:
a performance monitoring module in a fibre channel fabric switch element that receives a message from at least one monitoring agent indicating if a parameter value varies from a threshold value, and in response to the message, the performance monitoring module sends a message to an Event Response Director that selects an event in an Event Response Table and sends control signals to a Local Event Handler and an External Event Generator, and the Local Event Handler performs control actions on a local fabric switch and the External Event Generator sends input/output registered state chance notices to host computing systems; and the Event Response Table and the threshold table is updated by a Threshold Event Configuration module.

10. The system of claim 9, wherein the threshold values in the threshold table are updated based on a user request.

11. The system of claim 9, wherein the monitoring agent includes a Chassis monitoring module, a fabric monitoring module, a port monitoring module, and/or a Nx_Port event monitoring module.

12. The system of claim 9, wherein the threshold values are updated based on historical data and/or reliability data.

13. The system of claim 9, wherein the performance monitoring module consolidates threshold events and control signals sent by plural monitoring agents, if a threshold value for a parameter is exceeded.

14. The system of claim 9, wherein an event is generated in response to the notification based on the event response table.

15. The system of claim 9, wherein the event response module notifies a host computer of the variation.

16. A method for monitoring events in a storage area network, comprising:
monitoring at least one parameter value, wherein at least one monitoring agent in a fibre channel fabric switch monitors the parameter value;
comparing the parameter value to a threshold value; and
notifying a performance monitoring module if the parameter value varies from the threshold value; wherein the performance monitoring module sends a message to an Event Response module that selects an event in an Event Response Table and sends control signals to a Local Event Handler and an External Event Generator, and the Local Event Handler performs control actions on a local fabric switch and the External Event Generator sends input/output registered state change notices to host computing systems; and the Event Response Table and the threshold table is updated by a Threshold Event Configuration module based on historical data.

17. The method of claim 16, further comprising:
consolidating plural threshold variations and notifying an event response module of the variations, wherein the performance monitoring module consolidates plural threshold variations.

18. The method of claim 17, further comprising:
generating an event in response to a threshold variation.

19. The method of claim 17, further comprising:
notifying a host computer of the threshold variation, wherein the performance monitoring module notifies the host computer.

20. A system for notifying a computing system of an indicator that precedes a failure in a storage area network, comprising:
at least one monitoring agent in a fibre channel fabric switch element that monitors an indicator that can result in a failure in the storage area network; and
a performance monitoring module that compares an indicator value to a threshold value and coordinates an event if the indicator value varies from the threshold value, wherein the performance monitoring module sends a message to an Event Response Director that selects an event in an Event Response Table and sends control signals to a Local Event Handler and an External Event Generator, and the Local Event Handler performs control actions on a local fabric switch and the External Event Generator sends input/output registered state change notices to host computing systems; and the Event Response Table and the threshold table is updated by a Threshold Event Configuration module.

21. The system of claim 20, wherein the threshold table is updated based on historical data and/or reliability data.

22. The system of claim 21, wherein the monitoring agent includes at least a chassis monitor, port monitor, Nx_Port monitor, and/or fabric monitor.

23. The system of claim 22, wherein the chassis monitor detects when an indicator value for a switch chassis varies from a threshold value and notifies the performance monitoring module of the variation.

24. The system of claim 22, wherein the port monitoring module tracks port statistics for fibre channel ports and sends a message to the performance monitoring module to process an event when a fibre channel port link indicator value varies from the threshold value.

25. The system of claim 22, wherein the fabric monitoring module detects when a remote fabric switch and a local fabric switch cannot exchange information and then sends a message to the performance monitoring module.

26. A fibre channel fabric switch element, comprising:
a port monitoring agent that monitors at least a parameter value and detects when a parameter value varies from a threshold value for a parameter, wherein the port monitoring agent sends a message to a performance monitoring module to process an event when the parameter value varies from the threshold value; wherein the performance monitoring module sends a message to an Event Response Director that selects an event in an Event Response Table and sends control signals to a Local Event Handler and an External Event Generator, and the Local Event Handler performs control actions on a local fabric switch and the External Event Generator sends input/output registered state change notices to host computing systems: and the Event Response Table and the threshold table is updated by a Threshold Event Configuration module.

27. The switch element of claim 26, wherein the performance monitoring module notifies a host computer when the parameter value varies from the threshold value.

28. The switch element of claim 27, wherein a fibre channel port with a parameter value that varies from the threshold value is taken off-line.

29. The switch element of claim 26, wherein the monitoring agent includes a Chassis monitoring module, a fabric monitoring module, a port monitoring module, and/or a Nx_Port event monitoring module.

30. The switch element of claim 29, wherein the fabric monitoring module detects when a remote fabric switch and a local fabric switch cannot exchange information.

31. The switch element of claim 29, wherein the chassis monitor detects when an indicator value for a switch chassis varies from a threshold value and notifies the performance monitoring module of the variation.

32. The switch element of claim 29, wherein the port monitoring module tracks port statistics for fibre channel ports and sends a message to the performance monitoring module to process an event when a fibre channel port link indicator value varies from the threshold value.

* * * * *

UNITED STATES PATENT AND TRADEMARK OFFICE
CERTIFICATE OF CORRECTION

| | | |
|---|---|---|
| PATENT NO. | : 7,103,504 B1 | Page 1 of 1 |
| APPLICATION NO. | : 10/719077 | |
| DATED | : September 5, 2006 | |
| INVENTOR(S) | : Edward C. McGlaughlin et al. | |

It is certified that error appears in the above-identified patent and that said Letters Patent is hereby corrected as shown below:

On the Title Pg, Item (56) on page 2, under "Other Publications", line 7, delete "Consideration" and insert -- Considerations --, therefor.

In column 9, line 50, in claim 9, delete "network" and insert -- network, --, therefor.

In column 9, line 63, in claim 9, delete "chance" and insert -- change --, therefor.

In column 12, line 2, in claim 26, delete "systems:" and insert -- systems; --, therefor.

Signed and Sealed this

Twenty-sixth Day of October, 2010

David J. Kappos
*Director of the United States Patent and Trademark Office*